No. 770,094. PATENTED SEPT. 13, 1904.
G. G. McGILL.
SAW.
APPLICATION FILED APR. 13, 1904.
NO MODEL.
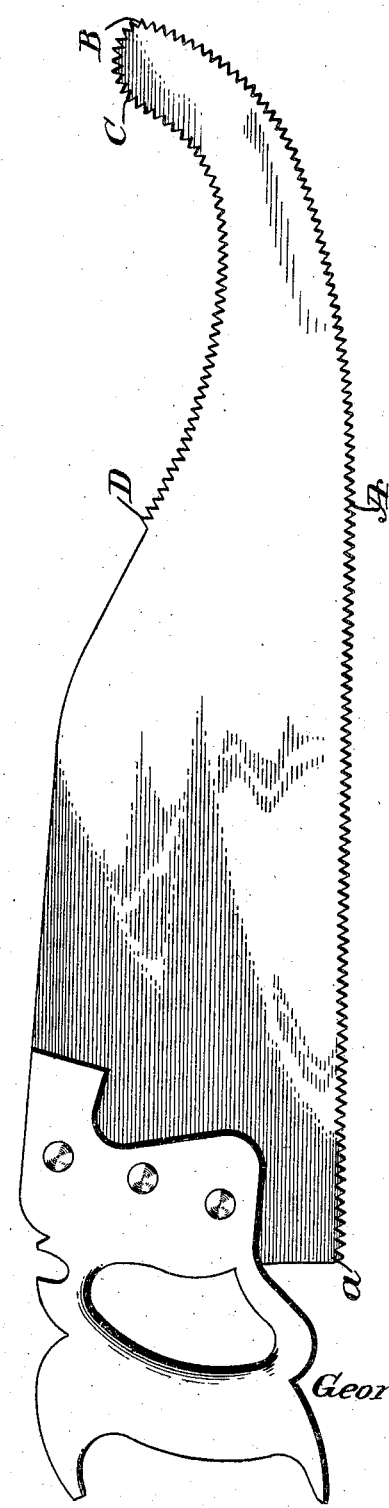
WITNESSES:
John J. Kittle
A. S. Fay.
INVENTOR
George G. McGill
BY
ATTORNEYS No. 770,094. Patented September 13, 1904.

UNITED STATES PATENT OFFICE.

GEORGE GERT McGILL, OF DECATUR, INDIANA.

SAW.

SPECIFICATION forming part of Letters Patent No. 770,094, dated September 13, 1904.

Application filed April 13, 1904. Serial No. 202,923. (No model.)

*To all whom it may concern:*

Be it known that I, GEORGE GERT McGILL, a citizen of the United States, and a resident of Decatur, in the county of Adams and State of Indiana, have invented a new and Improved Saw, of which the following is a full, clear, and exact description.

My invention relates to a saw; and the principal object is to make a saw that will cut through flooring, weather-board, timber, and the like at all places where a section of board, wall, floor, or timber is to be removed without first boring holes and without using a keyhole-saw to start the kerf.

My improved saw may be used in sawing the above-mentioned objects as well as on the centers of sills, sleepers, or studding, so as to remove parts and leave other parts bare for the purpose of joining window or door frames or boards of any kind for all purposes.

Reference is to be had to the accompanying drawing, forming part of this specification, in which the figure is a side view of a preferred form of my invention.

The blade of the saw from the heel $a$ to the point A is preferably straight, as is usually the case with handsaws, and from the point A to the tip of the blade at B a convex curve is given to the blade. At the tip of the saw from B to C there is a small convex curve forming the end of the back of the saw, and from the point C to a point D, part way to the rear on the back of the blade, is a concave curve. It will be obvious that the forms of these curves may be varied to a considerable extent within the limits of my invention and that the exact sequence of the curves may be departed from to a certain degree without departing from the spirit thereof. The curves shown from a point part way between A and B to B as well as from B to C and part of that from C to D are preferably circular; but other curves than the arcs of circles may be employed.

It is to be understood, of course, that the edge of the saw throughout all the portions described is provided with teeth of any desired character, preferably such as those usually employed in handsaws, and that teeth may be extended to a position farther back than the point D, if desired. Of course any desired handle may be employed, and I have shown a kind in common use on saws of this character.

In the use of my improved saw the part from A to B is used to start the kerf and to saw through floors, walls, and the like by slightly raising the heel of the saw. By turning the saw the part from B to C can be used for sawing short kerfs through floors, walls, &c., and the part from C to D is used to lengthen the kerf made by the part from B to C. It will thus be seen that every part of my saw-blade is designed for a special purpose and that additional usefulness has been imparted to saws by my invention.

Having thus described my invention, I claim as new and desire to secure by Letters Patent—

1. A handsaw having a lower edge, a convexly-curved point portion, and a concavely-curved back portion, all of said portions of the edge being provided with teeth and being continuous one with another.

2. A handsaw having a toothed lower edge, a toothed concavely-curved upper edge, and a toothed convexly-curved point connecting said two edges all of said edges being continuous one with another.

3. A saw provided with a lower edge having a straight portion and a convexly-curved portion near the point thereof, a convexly-curved point portion, and a concavely-curved rear portion, all of said portions being provided with teeth and being continuous one with another.

In testimony whereof I have signed my name to this specification in the presence of two subscribing witnesses.

GEORGE GERT McGILL.

Witnesses:
JOHN S. FALK,
BENJ. J. SMITH.